Nov. 27, 1923.
T. C. URTASUN
1,475,903
MILK CAN HOLDER
Filed May 6, 1922
2 Sheets-Sheet 1
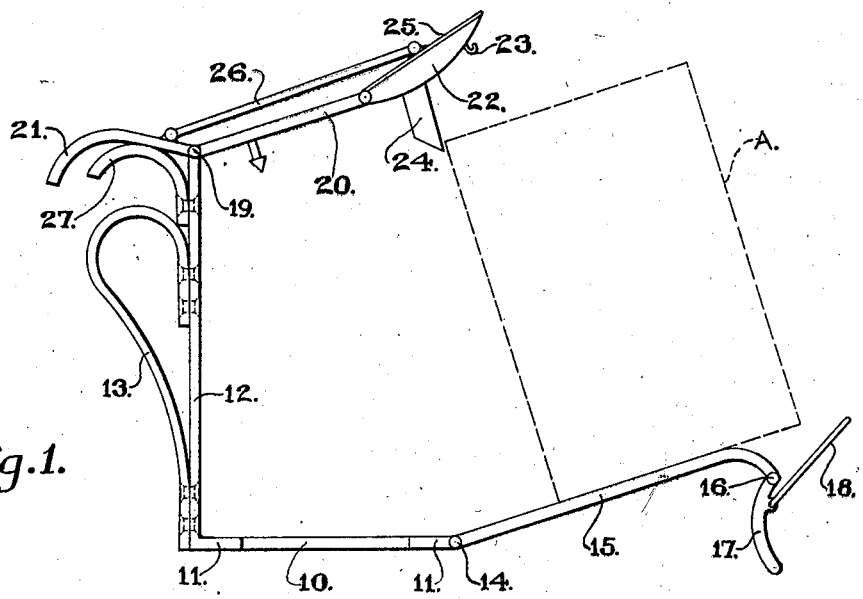
Fig.1.
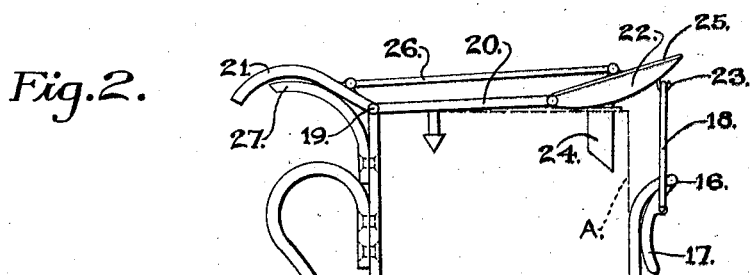
Fig.2.
Fig.3.
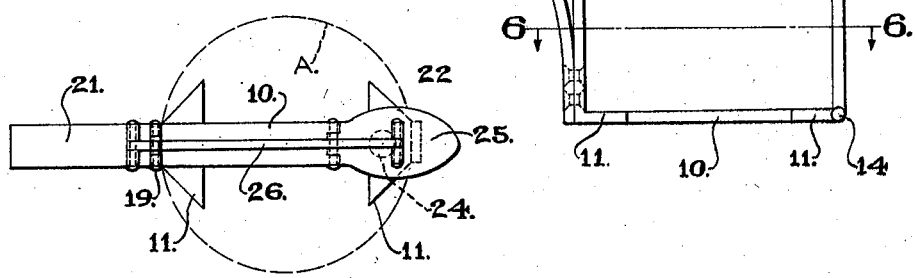
T.C. Urtasun.
INVENTOR
BY Victor J. Evans
ATTORNEY
WITNESS: H. A. La Clair.

Nov. 27, 1923.  1,475,903
T. C. URTASUN
MILK CAN HOLDER
Filed May 6, 1922     2 Sheets-Sheet 2

T.C. Urtasun.
INVENTOR
BY Victor J. Evans
ATTORNEY

H. A. LaClair
WITNESS:

Patented Nov. 27, 1923.

1,475,903

UNITED STATES PATENT OFFICE.

TONY C. URTASUN, OF CASTAIC, CALIFORNIA.

MILK-CAN HOLDER.

Application filed May 6, 1922. Serial No. 558,944.

*To all whom it may concern:*

Be it known that I, TONY C. URTASUN, a citizen of the United States, residing at Castaic, in the county of Los Angeles and State of California, have invented new and useful Improvements in Milk-Can Holders, of which the following is a specification.

This invention relates to kitchen and table articles and has for its object the provision of a novel device for holding a can of evaporated milk so as to facilitate handling thereof, the device being furthermore provided with a means for punching a hole in the can to permit the pouring out of the contents.

An important object is the provision of a device of this character which may be clamped upon the can and which will therefore operate to prevent accidental dropping thereof, the device being provided with a handle and with a cover for the discharge spout which will operate to exclude flies and dirt.

An additional object is the provision of a device of this character which will be simple and inexpensive in construction, easy to apply and use, efficient and durable in service and a general improvement in the art.

With the above and other objects and advantages in view, the invention consists in the details of construction to be hereinafter more fully described and claimed, and illustrated in the accompanying drawings, in which:—

Figure 4:
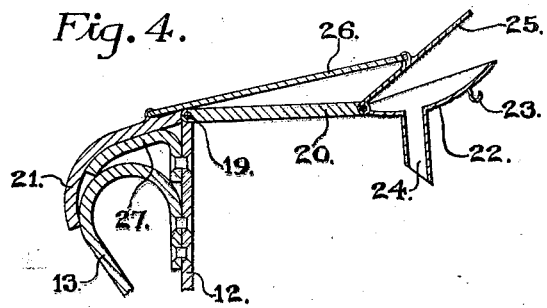
Figure 5:
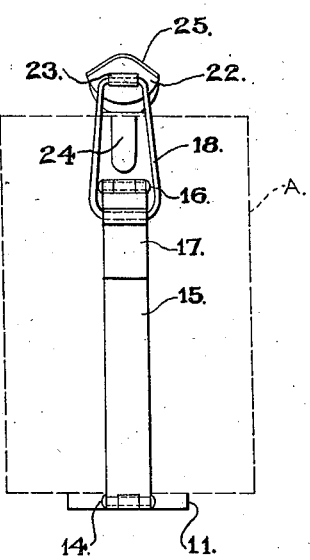
Figure 6:
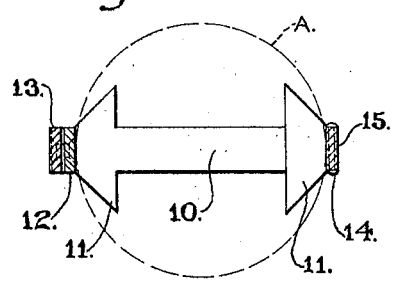

Figure 1 is a side elevation of the device showing it in open position in the act of receiving a milk can, Figure 2 is a side elevation showing the milk can clamped in position, Figure 3 is a plan view, Figure 4 is a vertical section taken through the upper portion of the device and showing the spout lid in open position, Figure 5 is an elevation taken at right angles to Figure 1, Figure 6 is a cross sectional view showing a plan view of the base.

Referring more particularly to the drawings the letter A designates a milk can containing evaporated or condensed milk, or syrup as the case may be, my device being equally well adapted for use in connection with a can of any type containing a liquid provided the sizes of the parts of my device conform to the size of the can.

It is well known that it is customary especially with evaporated milk cans to punch one or more holes in the top and then pour out the contents whenever use is desired. This method has a great disadvantage inasmuch as the holes become clogged and serve frequently as congregating places for flies. It is with these facts in view that I have designed the present device which comprises a frame including a bottom formed as a strip 10 having its ends provided with relatively wide bearing portions 11 for supporting the bottom of the can. The frame further includes an upright strip 12 which is rigid with respect to the bottom and upon which is mounted a handle 13. Hinged at 14 upon the free end of the bottom is a movable strip 15 upon the end of which is pivoted, at 16, a movable handle 17 with which is pivotally connected an elongated loop 18, preferably wire.

Hinged at 19 upon the upper end of the strip 12 is a top member 20 which has one end formed with a thumb piece 21 disposed above the handle 13. Mounted upon the free end of the top piece 20 is a spout 22 at one edge of which is a hook 23 and from the bottom of which depends a tubular penetrating member 24. This spout 23 is normally closed by a hinged plate 25 with which is connected a rod 26 pivotally connected with the thumb piece 21. A leaf spring 27 engages the underside of the thumb piece 21 for normally holding the plate or lid 25 closed.

Assuming that the device is in open position as shown in Figure 1 the milk can which is represented by dotted lines may be readily disposed upon the bottom member 10 in engagement with the strip 12, after which the top member 20 is swung down and pressed firmly so that the penetrating member 24 will be forced through the tin into the can. The movable strip 15 is then swung into engagement with the can, the loop 18 is engaged over the hook 23 and the member 17 is swung down to apply tension to the loop and hook for holding the device firmly in position upon the can.

When use of the milk is desired it is merely necessary that the operator tip the can in the proper direction and press upon the thumb piece 21 which will result in pulling the rod 26 and opening the lid 25 so that the contents of the can may pass out through the tubular member 24 and through the spout 22. When pressure upon the thumb piece is relieved the cover or lid 25 will close and prevent access of flies and dirt to the spout.

From the foregoing description and a study of the drawings it will be apparent that I have thus provided a simply constructed and consequently inexpensive milk can holder which will be very convenient to use and which will be sanitary as keeping the milk in better condition. It is of course to be seen that the device may be made as ornamental as may be desired so that it may present a pleasing appearance.

While I have shown and described the preferred embodiment of the invention, it is of course to be understood that I reserve the right to make such changes in the form, construction and arrangement of parts as will not depart from the spirit of the invention or the scope of the subjoined claim.

Having thus described my invention I claim:

A holder for a can of milk comprising an L-shaped support including a horizontal portion and a vertical portion, a strip hinged upon the free end of the horizontal portion and carrying a pivoted handle, a top piece hinged upon the upper end of the vertical portion and terminating in a cup formed with a depending tube having a pointed end, a hook on the underside of said cup, a loop pivoted on said handle near its pivot and engageable with said hook, a handle on the vertical portion of said L-shaped support, a cover hinged upon said top piece for covering said cup, a thumb piece pivoted upon the upper end of the vertical portion of the L-shaped support and located above the second named handle, and a link pivotally connected with said cover and with said thumb piece.

In testimony whereof I affix my signature.

TONY C. URTASUN.